United States Patent [19]

Field

[11] Patent Number: 4,766,432

[45] Date of Patent: * Aug. 23, 1988

[54] TELEMETRY SYSTEM FOR FLOOR MAINTENANCE MACHINES

[75] Inventor: Bruce F. Field, Minneapolis, Minn.

[73] Assignee: Tennant Company, Minneapolis, Minn.

[ * ] Notice: The portion of the term of this patent subsequent to Jun. 30, 2004 has been disclaimed.

[21] Appl. No.: 839,879

[22] Filed: Mar. 14, 1986

[51] Int. Cl.[4] .......................... H04Q 9/00; G08B 5/36

[52] U.S. Cl. ............................ 340/825.17; 340/825.1; 340/870.07; 340/679; 340/518; 340/525; 15/339

[58] Field of Search ........... 340/825.07, 825.1, 825.16, 340/825.17, 825.36, 825.72, 825.73, 825.75, 825.76, 518, 525, 679, 685, 870.07, 870.28; 15/319, 320, 340, 339, 98, 49 R, 50 R, 385

[56] References Cited

U.S. PATENT DOCUMENTS

| | | | |
|---|---|---|---|
| 3,530,434 | 9/1970 | Stites et al. | 340/825.75 |
| 3,803,594 | 4/1974 | Klein et al. | 340/518 |
| 3,812,492 | 5/1974 | Gotanda | 340/518 |
| 3,952,361 | 4/1976 | Wilkins | 15/319 |
| 4,020,477 | 4/1977 | Holland | 340/518 |
| 4,207,649 | 6/1980 | Bates | 15/319 |
| 4,306,329 | 12/1981 | Yoki | 15/319 |
| 4,511,974 | 4/1985 | Nakane et al. | 340/685 |
| 4,675,935 | 6/1987 | Kasper et al. | 15/319 |
| 4,679,271 | 7/1987 | Field et al. | 15/320 |

OTHER PUBLICATIONS

IEEE Standard Dictionary of Electrical and Electronics Terms, Third Edition, 8/10/84, p. 922.

*Primary Examiner*—John W. Caldwell, Sr.
*Assistant Examiner*—Edwin C. Holloway, III
*Attorney, Agent, or Firm*—Kinzer, Plyer, Dorn, McEachran & Jambor

[57] ABSTRACT

A telemetry system for a surface maintenance machine such as a scrubber or a sweeper has a plurality of sensors which monitor machine operating conditions. The sensors are periodically scanned and repetitive outputs indicative of sensor condition are used to provide tone coded telemetry signals. The tone coded signals are modulated on a suitable carrier frequency and are sent to a receiver which is remote from the sensors. The receiver decodes the tone coded signals to provide a display of the conditions being monitored by the sensors. The tone coded outputs from the transmitter also include an identification of the particular machine which is providing information for the display at the receiver.

5 Claims, 3 Drawing Sheets

TELEMETRY SYSTEM FOR FLOOR MAINTENANCE MACHINES

SUMMARY OF THE INVENTION

The present invention relates to surface maintenance machines such as scrubbers or sweepers and in particular to a telemetry system which will transmit signals representative of machine operating conditions to a remote location such as an operator's console or a maintenance area.

A primary purpose of the invention is a telemetry system for use with a surface maintenance machine, for example an unattended machine, in which the conditions of a plurality of machine sensors are repetitively scanned and broadcast to a receiver location.

Another purpose is a simply constructed and reliably operable telemetry system of the type described using audio tone generators to provide coded output signals representative of the conditions being monitored.

Another purpose is a telemetry system of the type described which will perform reliably in an industrial environment in spite of the static and electronic noise commonly found in such an environment.

Another purpose is a telemetry system of the type described which includes a coded identification of a particular machine along with the tone coded signals representative of the conditions being monitored.

Another purpose is a telemetry system for use with a self-propelled unattended surface maintenance machine such as a scrubber or sweeper which provides a constant sequential and repetitive display of machine operating conditions.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present invention is concerned with surface maintenance machines, particularly scrubbers and sweepers. As described herein, the surface maintenance machine comprises an unattended self-propelled vehicle, for example a forklift truck which mounts a self-contained scrubber. The scrubber is essentially a passenger on the vehicle and does not have control over vehicle speed. Because the vehicle is unattended or without an operator, it is necessary that the scrubber have a control system which monitors various of its functions, as well as a means for transmitting an indication of such functions to an operator. The operator may be in a remote location, such as a control room, maintenance area or the like, or the operator may be at another portion of the machine where he is unable to view or easily be aware of the machine operating conditions.

Although the invention will be described in connection with a vehicle which mounts a scrubber and on which the scrubber is removably positioned, the invention is not so limited. The scrubber controls and the associated telemetry system may be equally applicable to an integrated scrubbing unit. Even though the scrubber described does not utilize an operator actually on the machine, again the controls and monitors may be applicable to a scrubbing apparatus in which the operator is in attendance, but because of the size or use of the machine, it is required that there be constant monitoring of machine operation.

Although the invention will be described in connection with a scrubber, it should be understood that many, if not all, of the aspects of the telemetry system, are equally applicable to a sweeping apparatus.

Figure 1:
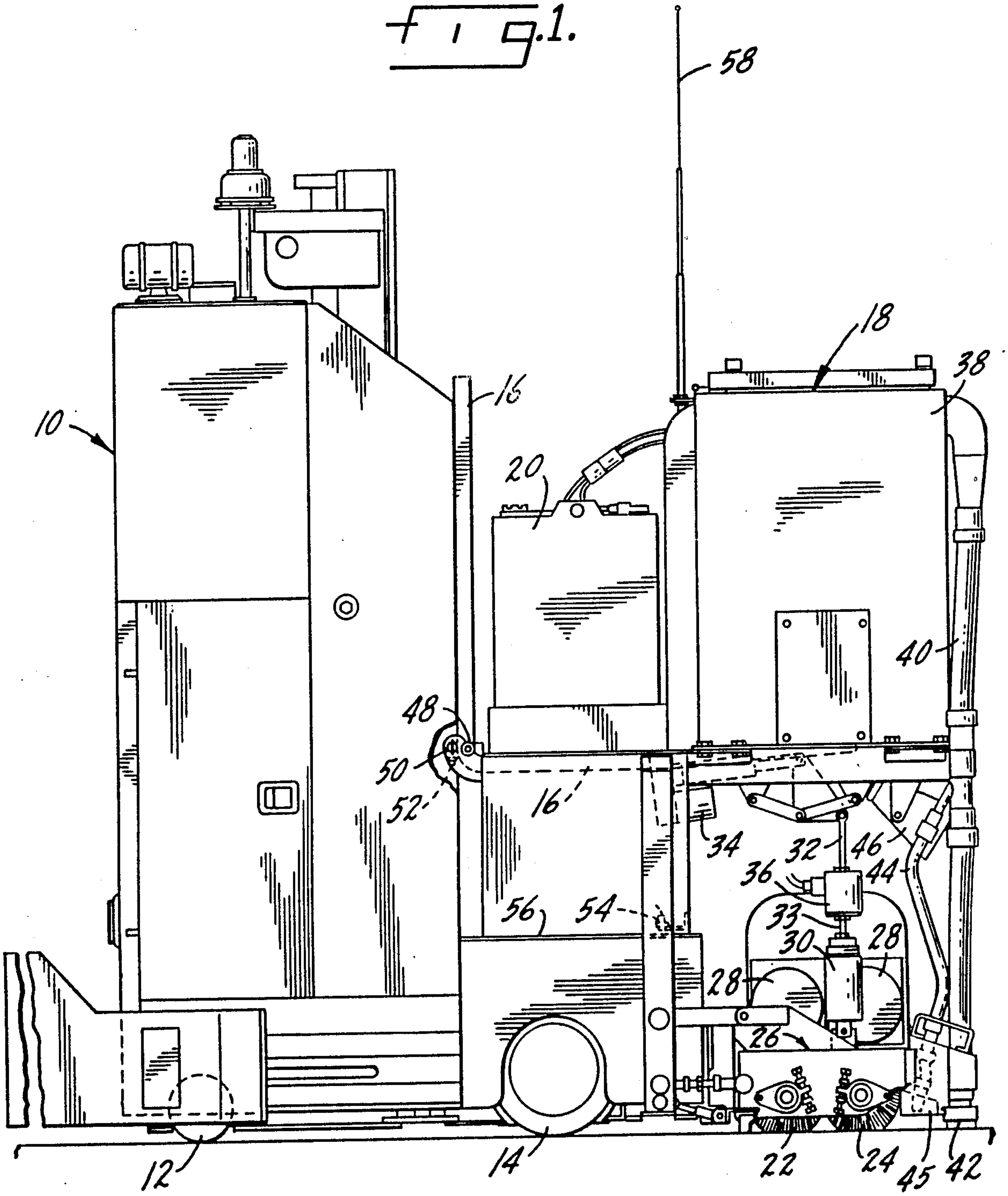
FIG. 1 is a side view of a surface maintenance machine of the type described.

In FIG. 1, a vehicle is indicated at 10 and may have wheels 12 and 14. The vehicle is shown as a forklift truck, with the forks of the forklift being indicated at 16. In the particular application shown, the truck or vehicle is unattended in that it does not have an operator present. It may be guided by inductive signals from a wire buried in the floor over which it is passing or by other means.

Mounted upon the fork 16 of the forklift truck 10 is a scrubbing apparatus indicated generally at 18. The scrubbing apparatus has a battery 20 to provide power. The vehicle 10 will be propelled by its own power and the scrubbing apparatus will have no control over the speed or movement of the vehicle.

A pair of counterrotating scrubbing brushes 22 and 24 are a part of a scrub head 26. Drive motors 28 drive the brushes and the scrub head is mounted by means of a spring load mounting 30 and threaded rods 32 and 33 to an actuator 34 which is used to raise and lower the scrub head and thus the rotating brushes. A load cell 36 is a part of the mounting for the scrub head and is used to determine whether or not the brush weight actually carried upon the surface being treated is consistent with the desired pattern of brush application to the surface. The details of the brush height control apparatus are disclosed in a copending application, Ser. No. 839,877, filed simultaneously herewith, now U.S. Pat No. 4,679,271.

The scrubbing apparatus will include a solution tank and a solution pump and a detergent tank and a detergent pump. Together this apparatus will supply a cleaning solution to the floor. The cleaning solution will be sucked up to a recovery tank which is indicated at 38, through a vacuum pickup apparatus which includes a hose 40 connected to the recovery tank and to the squeegee apparatus indicated generally at 42. A vacuum pickup 44 is mounted directly in front of the squeegee to pick up water from tray 45 which catches debris which has been loosened by the scrubbing brushes. All of the above-described apparatus is conventionally found in scrubbers, although not necessarily constructed and positioned in the manner disclosed above.

Because the scrubbing apparatus is riding upon the vehicle, rather than being an integral part thereof, it is necessary that there be a means to detect the speed and direction of the vehicle prior to the time that the scrubbing apparatus is actuated. A radar velocity sensor is indicated at 46 and is conventional to the extent that it is used to sense speed and direction of the vehicle. Other forms of speed and direction sensing devices may be equally satisfactory. For example, a rotation sensor might be applied to wheel 14.

In addition to checking on the speed of the vehicle, it is necessary to insure that the scrubbing apparatus is properly attached to the vehicle and is at the proper height above the floor surface. To this end, there are infrared photoelectric sensors, for each fork of the forklift, one of the sensors being indicated at 48. Also, there are safety pins, one for each fork of the forklift, one of which is indicated at 50, with the safety pins having associated pin sensors 52 to indicate that the safety pins are in position on the forks, thereby insuring that the scrubbing apparatus is properly secured. Further, there is a platform sensor 54 which is effective to sense the relationship between the scrubbing apparatus and a platform 56 forming a part of the forklift truck which actually supports the scrubbing apparatus. All of these sensors must be operable prior to the time that the scrubbing operation can begin.

In addition to monitoring the position and mounting of the scrubbing apparatus on the vehicle, since the machine is operating unattended, there are a number of other functions which must be monitored in order to insure proper operation. The scrubbing apparatus will have a solution tank, detergent tank and recovery tank, all of which must be monitored for proper level. There are pumps for the solution tank and detergent tank and a vacuum fan for the recovery tank. These must all be monitored. In like manner, the brush drive motors should be monitored to insure that the motors are not overloaded and the height of the brushes should be monitored to insure that a proper sweeping or scrubbing operation is actually taking place. Further, it is important to monitor the speed of the machine.

The present invention is particularly concerned with a means for transmitting an indication of all of the above-described monitors or sensors from the machine to a remote location and to that end an antenna 58 extends upwardly from the scrubbing apparatus.

Figure 2:
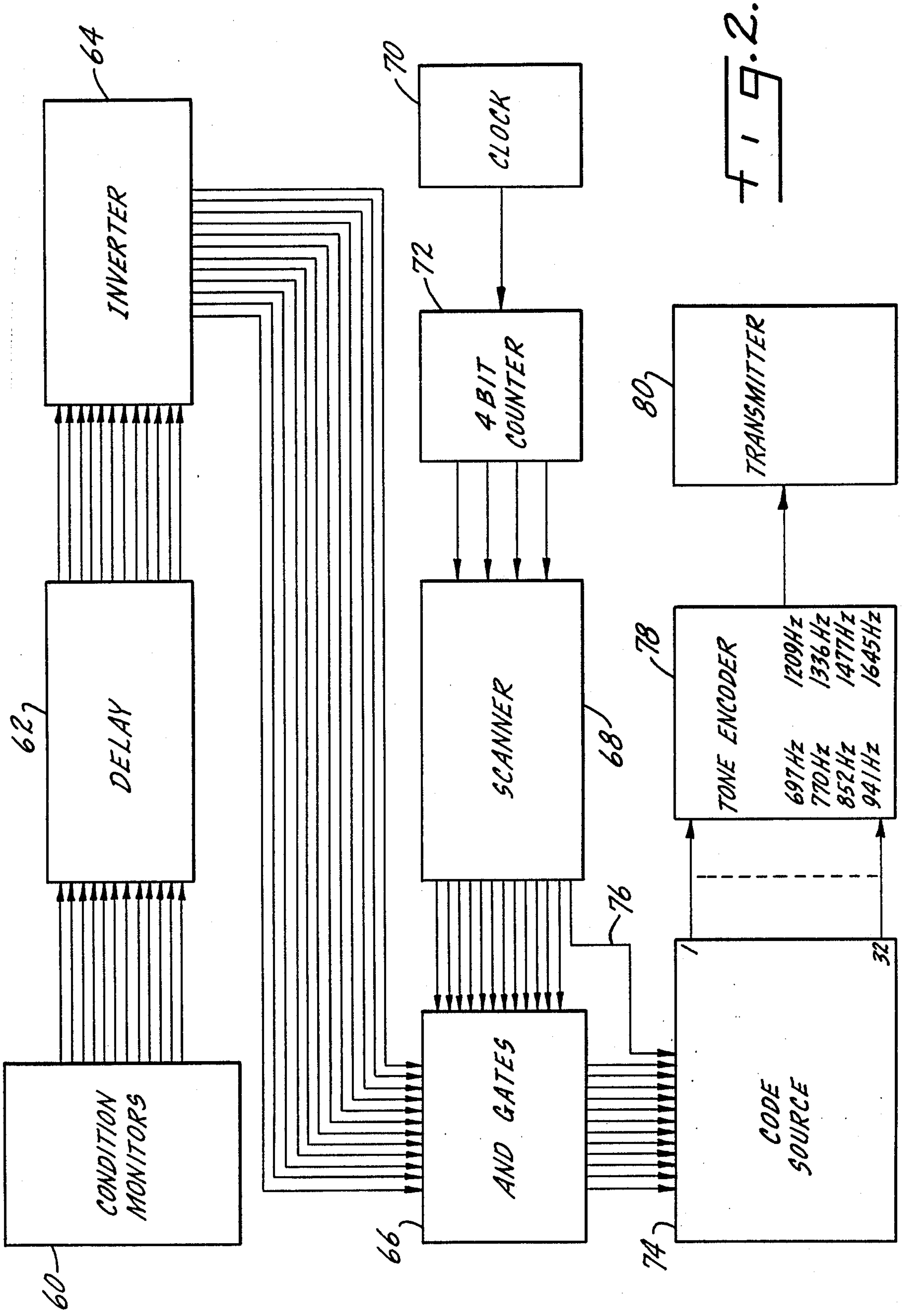
FIG. 2 is a block diagram of the telemetry transmitting circuit.
Figure 3:
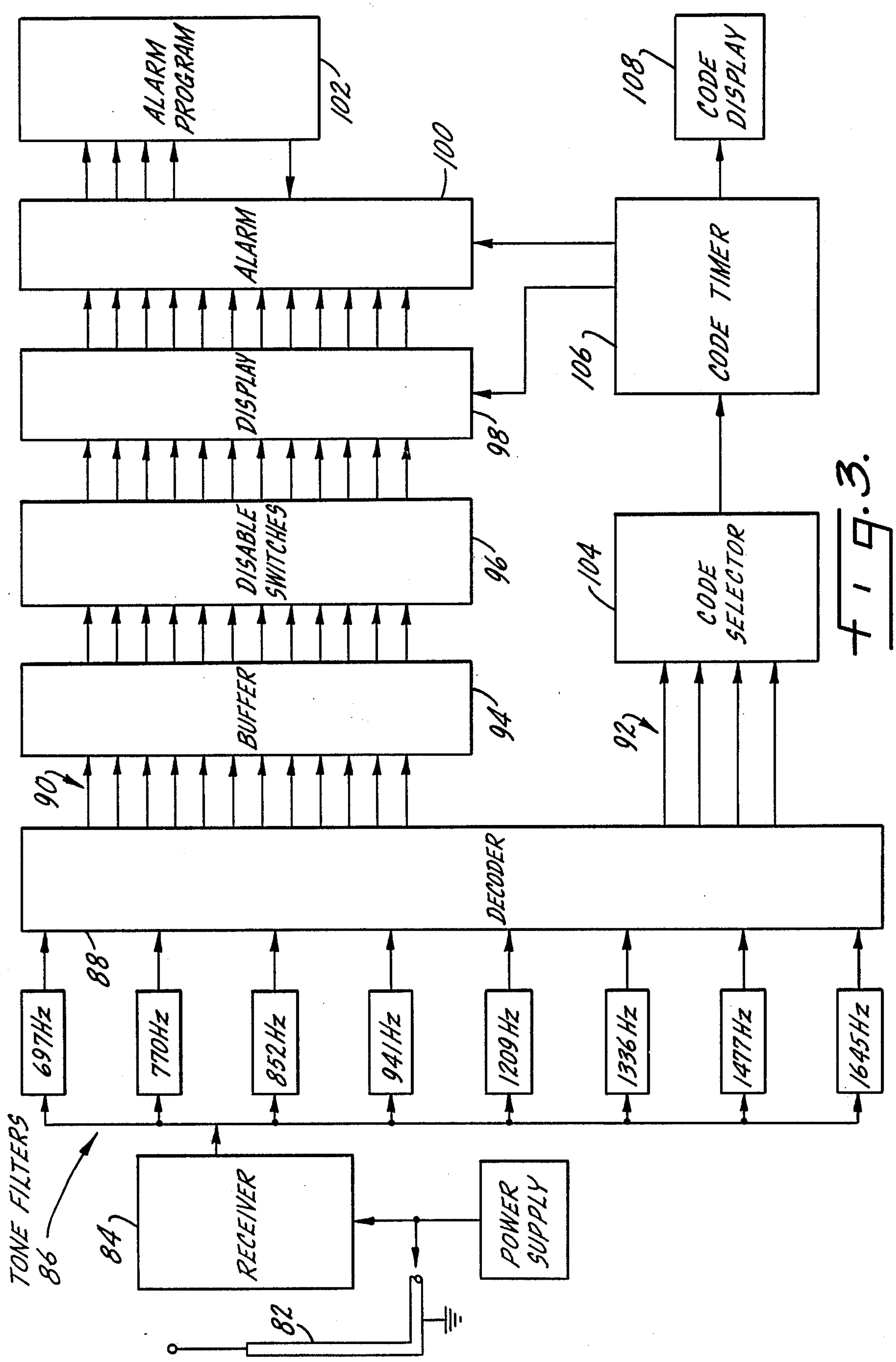
FIG. 3 is a block diagram of the telemetry receiver and display.

FIGS. 2 and 3 describe the transmitter and receiver, respectively, which form a part of the telemetry system, with the inputs from the telemetry system being the monitors which will sense the condition of the various functions described above. In FIG. 2, a plurality of condition monitors are represented by the box 60 and there are twelve outputs, indicative of twelve monitors or sensors. The number of monitors or sensors may of course vary, depending upon the needs of a particular machine. Each of the twelve output lines from box 60 are connected to a delay circuit 62 which is used to avoid false indications of an improper operating condition. For example, the delay circuit may delay an output anywhere from 3 to 17 seconds, depending upon factory adjustment. The output from delay circuit 62 is connected to an inverter 64 which reverses the polarity of any of the delayed output signals from condition monitors 60 which may be normally low so that all of the outputs of inverter 64 will be normally high.

Inverter 64 is connected to a plurality of AND gates 66, there being one AND gate for each of the input signals. A scanner is indicated at 68 and is controlled by a clock 70 connected to a four-bit counter 72, with the output from the counter being connected to scanner 68. Scanner 68 is effective to repetitively and sequentially cause the operation of each of the AND gates which are connected to the various inputs from the condition monitors. Thus, the condition of each sensor or monitor will be scanned on a periodic and repetitive basis. A scanning rate of from $2\frac{1}{2}$ to 3 seconds is satisfactory, although the actual scanning rate will depend upon noise in the environment, as the noisier the environment, the slower the scanning rate that is required.

Connected to AND gates 66 is a code source 74 which receives one input from each of the AND gates. In addition, it receives an input directly from scanner 68 along line 76, with the latter input being used to initiate a machine identification code which is provided by the code source. Code source 74 provides a unique coded output for each of the various inputs from the AND gates. For example, with twelve inputs and with the possibility of four machine identification codes, code source 74 will have 32 output lines. Twenty-four of the lines are for the twelve sensors, with eight of the lines being used to provide an output code indicative of machine identification.

The coded output signals from code source 74 are connected to a tone encoder 78 which, in the illustrated example, can provide eight different tones, all in the audio spectrum, and having the following frequencies: 697 Hz, 770 Hz, 852 Hz, 941 Hz, 1209 Hz, 1336 Hz, 1477 Hz and 1645 Hz. The coded outputs from code source 74 will provide an output from tone encoder 78 which consists of two independent and sequential tone bursts. For example, the condition of one monitor may be represented by the combination of tones of 697 and 1645 Hz. Another monitor may be represented by the combination of 770 and 1208 Hz. Thus, the output from tone encoder 78, which will be a coded output of two tone bursts, may be representative of the condition of one of the monitors or it might represent machine identification. It has been found that tone bursts of from 400 to 600 milliseconds duration will transmit reliable signals. The scanner will control the AND gates 66 and code source 74 such that each of the monitors is sequentially scanned. At the beginning or end of any particular scanning sequence, there will also be an output from code source 74 representative of the identification for a particular surface maintenance machine.

The output from tone encoder 78 is connected to a transmitter 80 wherein the audio tones are modulated on a carrier suitable for transmission over short distances as might be encountered in an industrial plant. 49.860 MHz has been found to be a satisfactory frequency for the use described and a maximum transmitter power of 150 mV has been found to provide adequate range in a typical industrial plant.

The signals from transmitter 80 will be received at an antenna indicated at 82 in FIG. 3 which is connected to a receiver 84 which includes means for demodulating the received signal. The output of the receiver is connected to a plurality of tone filters indicated at 86, each of which is effective to provide an output for a predetermined frequency which corresponds to the audio tones provided by tone encoder 78. Thus, the tone filters will provide eight different inputs to a tone decoder 88. Decoder 88, upon receipt of a message of two specific tones will provide an output along one of the twelve output lines indicated at 90, each of which represents one of the sensors or monitors of FIG. 2. Also, there are four output lines indicated at 92 which carry the machine code identifications. Thus, the decoder, upon receipt of any two tones which emanate from the transmitter, will decode and provide an output corresponding to the particular sensor or to identify the particular machine transmitting.

The output from decoder 88 on lines 90 goes to a buffer amplifier 94, with the output from the amplifier going to a plurality of disable switches 96. These switches are used to disable any particular monitor, as it may not be required that all of the conditions be monitored at all times. The output from disable switches 96 is connected to a display 98 which will be used to visually indicate to an operator the condition of any monitors currently being scanned and not having been disabled by one of the switches 96.

Display 98 is connected to an alarm circuit 100 which will provide an audio indication of an alarm condition at any one monitor or any group of monitors. To this end there is an alarm erogram control 102 which is effective to program alarm 100 so that alarms may be given off if any particular conditions are found in the monitoring process or any combination of conditions. Thus, a low solution tank may not be a problem by itself, but only when accompanied by an indication of a low level in a detergent tank. This combination of monitored conditions may be arranged to set off an alarm, as controlled by alarm program 102.

The output on lines 92 from decoder 88 is connected to a code selector 104 which provides an output of the code associated with the particular machine transmitting. Code selector 104 is connected to a code timer 106 which has outputs to display 98 and alarm 100 so that the display and alarm are associated with a particular machine. Code timer 106 is also connected to a code display 108 which will give a visual indication of the machine reporting the information on display 98 and associated with alarm 100. Absence of this display indicates that the machine is out of range or not transmitting. Code selector 104 is provided with manual selector switches, not shown. If more than one machine is transmitting, the operator by using the selector switches can select which machine is to be monitored. Alternatively, code selector 104 could be provided with a scanner to sequentially scan the transmitting machine codes.

Of particular importance in the present invention is the manner in which the information from the sensors is coded and transmitted to the receiver. The use of tone generators and coded tones is an economical and reliable form of telemetry. It is particularly suited in the electronically noisy environment of an industrial plant in which the scrubbers and sweepers using the telemetry system are normally found. Radiated electronic noise may interfere with part of the tone burst transmission, but enough will remain to transmit a reliable signal.

Whereas the preferred form of the invention has been shown and described herein, it should be realized that there may be many modifications, substitutions and alterations thereto.

The embodiments of the invention in which an exclusive property or privilege is claimed are defined as follows:

1. In a mobile unattended surface maintenance machine having rotating surface maintenance tools, a telemetry system including:

a plurality of sensors to monitor certain operating conditions relating to use of the rotating surface maintenance tools, scanning means connected thereto for repetitively providing condition signals therefrom, code generating means connected to provide code outputs in accordance with the sensor condition signals as scanned by said scanning means, code decoding means located remotely from the unattended surface maintenance machine, a communications link between said code generating means and said code decoding means, said decoding means providing output signals indicative of the conditions of said sensors, and a display connected to said code decoding means to display the conditions of said sensors.

2. The surface maintenance machine of claim 1 further characterized in that said communications link includes a transmitter connected to said code generating means and a receiver connected to said code decoding means.

3. The surface maintenance machine system of claim 2 further characterized in that said transmitter modulates the code outputs onto a carrier having power suitable for transmission over a relatively short distance, and said receiver demodulates said code output.

4. The surface maintenance machine of claim 1 further characterized in that said code generating means provides a machine identifying code which is repetitively communicated to said code decoding means.

5. A method for remotely monitoring the operating conditions of one or more unmanned mobile floor maintenance machines, including the steps of sensing predetermined operating conditions of each floor maintenance machine and periodically transmitting signals relating to its identity and said sensed operating conditions to a location remote from the machine and displaying the identity and sensed conditions of a particular machine at the remote location.

* * * * *